United States Patent [19]

Hefner, Jr.

[11] Patent Number: 4,777,196

[45] Date of Patent: * Oct. 11, 1988

[54] POLYMER MODIFIED UNSATURATED POLYESTER OR POLYESTERAMIDE RESINS

[75] Inventor: Robert E. Hefner, Jr., Lake Jackson, Tex.

[73] Assignee: The Dow Chemical Company, Midland, Mich.

[ * ] Notice: The portion of the term of this patent subsequent to Sep. 2, 2003 has been disclaimed.

[21] Appl. No.: 822,990

[22] Filed: Jan. 27, 1986

[51] Int. Cl.$^4$ .................. C08L 67/06; C08L 77/12
[52] U.S. Cl. .................. 523/518; 523/526; 524/513; 524/855; 524/878; 525/167; 525/168
[58] Field of Search .......... 524/513, 878, 855; 525/167, 168; 528/288; 523/526, 518

[56] References Cited

U.S. PATENT DOCUMENTS

| | | | |
|---|---|---|---|
| 4,148,765 | 4/1979 | Nelson | 428/430 |
| 4,247,335 | 1/1981 | Beckham | 106/279 R |
| 4,409,371 | 10/1983 | Hefner | 525/418 |
| 4,410,686 | 10/1983 | Hefner | 528/288 |
| 4,611,015 | 9/1986 | Hefner | 523/408 |

OTHER PUBLICATIONS

*Handbook of Composites* Lubin, G., p. 19, Van Nostrand Reinhold Co., 1982

Primary Examiner—Patricia Short
Attorney, Agent, or Firm—B. G. Colley

[57] ABSTRACT

Polymer modified unsaturated polyester(amides) are prepared by reacting ethylenically unsaturated polycarboxylic acids or anhydrides with water, polyol or mixtures of polyols and polyamines, and a hydrocarbon mixture comprising esterifiable hydrocarbons such as dicyclopentadiene, ethylenically unsaturated aromatic hydrocarbons such as styrene or polymerized derivatives thereof, and non-reactive hydrocarbons. The polyester(amides) have improved properties such as reduced shrinkage upon curing.

10 Claims, No Drawings

POLYMER MODIFIED UNSATURATED POLYESTER OR POLYESTERAMIDE RESINS

BACKGROUND OF THE INVENTION

The modification of unsaturated polyesters with the esterifiable reactive hydrocarbon dicyolopentadiene is a well established technology. Typical of this art are U.S. Pat. Nos. 4,370,447; 4,100,120; 4,148,765; 4,224,430; 4,233,432 and 4,246,367. Dicyclopentadiene is sold commercially as a product of about 97 or greater percent purity. It is also sold as $C_{10}$ hydrocarbon concentrate prepared by dimerizing a crude $C_{10}$ stream from the cracking of hydrocarbons as taught in U.S. Pat. No. 3,557,239. A preferred dicyclopentadiene source for use in modification of unsaturated polyesters is one that is low in peroxides and hydroperoxides and in light hydrocarbons and residual cyclopentadiene.

Dicyclopentadiene concentrates have as the main reactive component about 70 to 90 percent by weight of dicyclopentadiene and about 5 to about 30 percent by weight of mixed Diels-Alder dimers of diolefins such as butadiene, cis- and trans- piperylene, isoprene, cyclopentadiene and methyl cyclopentadiene. The remainder of these concentrates generally comprise residual $C_5$ hydrocarbons and oligomers of the above diolefins. Examples of some of the dimers which have been identified in these concentrates are the Diels-Alder adducts of two moles of isoprene (isoprene dimers), the adduct of cyclopentadiene and isoprene, the adduct of cyclopentadiene and piperylene, and the like. These $C_{10}$ hydrocarbon streams have very little or no ethylenically unsaturated aromatic hydrocarbons such as styrene. It is notable that the prior art teaches both the use of the $C_{10}$ concentrate or the relatively pure dicyclopentadiene as sources of esterifiable hydrocarbon reactives for the modification of unsaturated polyesters.

More recently, modification of unsaturated polyesteramides with the aforementioned dicyclopentadiene or $C_{10}$ concentrates has been described. Typical of this art are U.S. Pat. Nos. 4,410,686; 4,409,371 and 4,471,101.

SUMMARY OF THE INVENTION

The present invention provides a new class of modified unsaturated polyesters and polyesteramides having improvements in one or more mechanical properties such as tensile strength, elongation and flexural strength as well as reduced shrinkage upon curing.

The polymer modified unsaturated polyester(amide)s of this invention are produced by reacting the following reactants under resin forming conditions
(A) one or more alpha, beta ethylenically unsaturated polycarboxylic acids, anhydrides, or mixtures thereof with or without one or more saturated or aromatic polycarboxylic acids or anhydrides thereof
(B) an effective amount of water,
(C) one or more polyols or a mixture of one or more polyols and polyamines and
(D) a hydrocarbon mixture comprising
  (1) esterifiable hydrocarbons,
  (2) ethylenically unsaturated aromatic hydrocarbons with or without polymerized derivatives thereof and
  (3) non-reactive hydrocarbons.

DETAILED DESCRIPTION OF THE INVENTION

The polymer modified unsaturated polyesters or polyesteramides of the present invention are prepared via polymerization of
(A) one or more alpha, beta ethylenically unsaturated polycarboxylic acids, anhydrides, or mixtures thereof with or without one or more saturated or aromatic polycarboxylic acids or anhydrides thereof
(B) an effective amount of water,
(C) one or more polyols or a mixture of one or more polyols and polyamines and
(D) a hydrocarbon mixture comprising
  (1) esterifiable hydrocarbons,
  (2) ethylenically unsaturated aromatic hydrocarbons with or without polymerized derivatives thereof and
  (3) non-reactive hydrocarbons.

Typical ethylenically unsaturated polycarboxylic acids that are useful herein include maleic acid, fumaric acid, itaconic acid, maleic anhydride, mixtures thereof and the like. The remainder, if any, of the polycarboxylic acids are usually either saturated normal aliphatics such as adipic acid, succinic acid and the like or aromatics such as phthalic acid, phthalic anhydride, isopthalic acid and the like. The term polycarboxylic acid, as used herein, is intended to embrace the anhydride as well.

The ethylenically unsaturated polycarboxylic acid and/or anhydride provides the unsaturation needed for curing the resin. Therefore, the actual ratio of unsaturated acid to saturated or aromatic acid will be dictated by the degree of crosslinking desired in the cured product. That degree of crosslinking may be predetermined by simple preliminary experiments as is standard in the polyester art. The polycarboxylic acid is preferably maleic acid, fumaric acid, maleic anhydride or mixtures of those compounds.

The polyols that are useful herein are those which are reactive with polycarboxylic acids and/or anhydrides and may include, for example, the diols, such as ethylene glycol, propylene glycol, diethylene glycol, dipropylene glycol, butanediol, hexanediol, dicyclopentadiene dimethanol, triethylene glycol, polyethylene glycol and the polyols, such as polypropoxylated glycerin, polyethoxylated glycerin, pentaerythritol, glycerine, sorbitol; and trimethylolpropane. Mixtures of two or more of such polyols can be used. The polyol is preferably ethylene glycol, propylene glycol, a glycerin polypropoxylate or mixtures of those polyols.

The esterifable hydrocarbon reactives that are useful herein include, for example, dicyclopentadiene, $C_{10}$ hydrocarbon concentrates, polycyclopentadiene (dicyclopentadiene oligomers), norbornene, mixtures thereof and the like. Especially preferred are dicyclopentadiene and $C_{10}$ hydrocarbon concentrates.

For the purposes of this invention, an effective amount of water is that quantity which provides about 1.1 to about 2.0 moles per mole of unsaturated polycarboxylic acid or anhydride. A preferred range is about 1.5 to 2.0 moles of water per mole of unsaturated acid or anhydride.

The ethylenically unsaturated aromatic hydrocarbons that are useful herein include, for example, styrene, vinyl toluenes, allyl benzene, dimethyl styrenes, mixtures thereof and the like. Especially preferred are styrene and the vinyl toluenes.

The non-reactive hydrocarbons that are optionally present in the mixture containing esterifiable hydrocarbon reactives and ethylenically unsaturated aromatic hydrocarbons are those which are not reactive with the other components used to prepare the unsaturated polyesters and polyesteramides of the present invention. Included are aliphatic, cycloaliphatic, aromatic, alkylaromatic, polyalkylaromatic hydrocarbons and the like. Typical examples of said non-reactive hydrocarbons are toluene, xylene, cyclohexane and the like.

Typical polyamines that are useful herein to make the polyesteramide resins are those that are reactive with polycarboxylic acids and/or anhydrides and may include, for example, the diamines, such as ethylene diamine, propylene diamine, hexane-1,6-diamine, piperazine, 2-2'-bis(4-aminocyclohexyl) propane, bis-(aminomethyl) norbornane, toluene diamine and the polyamines, such as aminoethylpiperazine and diethylenetriamine. Mixtures of two or more of such polyamines can be used. The polyamine is preferably piperazine.

The mixture containing esterifiable hydrocarbon reactives, ethylenically unsaturated aromatic hydrocarbons and, optionally, non-reactive hydrocarbons may be obtained by direct blending of the required components or, more preferably, as a resin oil distillation cut from hydrocarbon processing. For purposes of the present invention, said resin oils consist of three distinct types of components: esterifiable hydrocarbon reactives including, for example, dicyclopentadiene, methyl dicyclopentadiene, cyclopentadiene codimers, diolefin dimers and the like; ethylenically unsaturated aromatic hydrocarbons including, for example, styrene and vinyl toluenes; and non-reactive hydrocarbons including aliphatic, cycloaliphatic, aromatic, alkylaromatic, polyalkyaromatic hydrocarbons and the like.

The composition of the resin oil can vary within wide limits depending on the hydrocarbon feedstock being processed, the type of process, the distillation conditions and many other known variables. The amount of the esterifiable hydrocarbon reactives component useful in the reactions of the present invention can vary from about 25 percent by weight (pbw) to about 95 pbw. The amount of the ethylenically unsaturated aromatic hydrocarbon component can vary from about 5 pbw to about 50 pbw. The remainder is the non-reactive hydrocarbon component. A typical resin oil composition is given in U.S. Pat. No. 4,247,335 (Col. 2).

The mixture containing esterifiable hydrocarbon reactives, ethylenically unsaturated aromatic hydrocarbons and, optionally, non-reactive hydrocarbons may be reacted with a free radical forming catalyst at a time and temperature suitable to induce polymerization of all or a part of the ethylenically unsaturated aromatic hydrocarbons contained therein. Said total or partial polymerization of the ethylenically unsaturated aromatic hydrocarbons is thus completed prior to reaction of the esterifiable hydrocarbon reactives in an unsaturated polyester or polyesteramide forming reaction. Suitable free radical forming catalysts include the organic peroxides and hydroperoxides as well as the azo and diazo compounds. Representative of said free radical forming catalysts are benzoyl peroxide, t-butylhydroperoxide, cumene hydroperoxide, azobisisobutyronitrile, mixtures thereof and the like. An inert atmosphere, such as is provided by nitrogen or argon gas, is typically employed in the total or partial polymerization reaction.

The ethylenically unsaturated aromatic hydrocarbons present in mixtures of esterifiable hydrocarbon reactives, ethylenically unsaturated aromatic hydrocarbons, and non-reactive hydrocarbons may be polymerized to the extent of 5 to 100 percent and preferably to the extent of 10 to 50 percent.

The preferred process of the present invention is the "prehydrolysis method" wherein a molten polycarboxylic anhydride is essentially totally hydrolyzed with stoichiometric or greater equivalency of water and reacted with the mixture containing esterifiable hydrocarbon reactives, ethylenically unsaturated aromatic hydrocarbons and, optionally, non-reactive hydrocarbons wherein none, a part, or all of the ethylenically unsaturated aromatic hydrocarbons are polymerized. The prehydrolysis reaction product is a mixture of polycarboxylic acid esters of the esterifiable hydrocarbon reactives containing unesterified acid, non-reactive hydrocarbons, if any are present, and polymerization products of the ethylenically unsaturated aromatic hydrocarbons. The term polymerization, as is used herein, is meant to encompass dimers, oligomers, copolymers, and homopolymers. This reaction may conveniently be performed in stages whereby reactants are added stepwise thus controlling reaction exotherms.

It is most preferred that a stoichiometric excess of water be used if the mixture containing esterifiable hydrocarbon reactives, ethylenically unsaturated aromatic hydrocarbons and, optionally, non-reactive hydrocarbons contains substantial amounts (about 2 percent by weight or more) unpolymerized (i.e. monomeric) ethylenically unsaturated aromatic hydrocarbons. A stoichiometric excess of at least about 10 mole percent and preferably 50 to 100 mole percent or more based on moles of polycarboxylic anhydride reactant is most preferred. The use of less than stoichiometric amounts of water can favor the presence of non-hydrolyzed polycarboxylic anhydride at the reaction temperatures typically employed. This polycarboxylic anhydride can enter into copolymerization reaction with the ethylenically unsaturated aromatic hydrocarbons thus producing a polymeric anhydride. The net result of this copolymerization can be eventual gelation of the reactor as well as substantial reduction in $\alpha,\beta$-unsaturated groups as provided by the polycarboxylic acid and used for later crosslinking reaction. The latter result can lead to a resin of poor curability and reactivity.

When a non-reactive hydrocarbon component is present, such as, for example, if a resin oil is used, a substantial amount of the non-reactive hydrocarbon component and water may azeotropically distill out of the reaction mixture. This material is preferably recycled back into the reactor during the prehydrolysis or contained in the reactor either under reflux or moderate pressure as is required to maintain the proper water stoichiometry.

In a typical procedure, molten maleic anhydride and a 75 mole percent excess of water are maintained at an elevated temperature of from about 100° to 150° C. The temperature is allowed to stabilize at about 100° to 110° C. then a mixture of dicyclopentadiene (80 pbw) and styrene (20 pbw) is added at a rate which maintains a reaction temperature between about 100° to 130° C. The amount of maleic (or other) anhydride employed in this prehydrolysis step may be equal to the equivalent of dicyclopentadiene in which event the product is essentially monoester (dicyclopentadienyl monomaleate) containing lesser amounts of diester [bis(dicyclopentadienyl maleate)], dicyclopentadienyl monoalcohol, maleic anhydride, maleic acid, polystyrene and the like. Alternatively, the amount of anhydride may be the equivalent needed to make the monoester plus that excess that is to be used in the subsequent esterification (or esteramidation) step. It is notable that reductions in the water stoichiometry (either in the initial charge or reductions incurred via distillative stripping during the reaction) favor retention of maleic anhydride and thus formation of styrene - maleic anhydride copolymer, a polyanhydride.

To the mixture of polycarboxylic acid esters of the esterifiable hydrocarbon reactives containing unesterified acid, non-reactive hydrocarbons, if any are present, and polymerization products of the ethylenically unsaturated aromatic hydrocarbon is added the polyol and a polyamine, if used. When a polyamine is used, that addition can be a bulk addition wherein all of the polyol and polyamine are added in one step. Alternately the addition can be an incremental addition wherein all of the polyol and a fractional equivalent of the polyamine are added initially and allowed to react after which subsequent increments of polyamine are added. In all instances, water is continuously removed during the esterification (esteramidation step). The timing of the remaining polyamine additions can be easily determined by the amount of water removed, by acid number or by viscosity. Incremental polyamine addition aids in the control of reaction exotherm when some polyamines are used.

After addition of polyol and, optionally, polyamine, is complete, the reaction can be driven to maximum yield by maintaining or increasing the temperature until the desired acid number has been achieved. Typically, acid numbers of 15 to 40 are preferred, with 20 to 35 most preferred. Acid numbers that are somewhat higher or lower may be tolerated and, in some instances, may be desired for certain applications.

The "hydrolysis" method wherein molten polycarboxylic anhydride, is partially hydrolyzed with less than the stoichiometric equivalent of water and reacted with the mixture containing esterifiable hydrocarbon reactives, ethylenically unsaturated aromatic hydrocarbons and, optionally, non-reactive hydrocarbons is only satisfactory for use with the aforesaid mixtures wherein all or a substantial part of the ethylenically unsaturated aromatic hydrocarbons have been polymerized. Generally less than about 5 pbw unreacted (monomeric) ethylenically unsaturated aromatic hydrocarbons should be present in the mixture if the hydrolysis method is employed.

In a typical procedure, molten maleic anhydride and a fraction of the stoichiometric equivalent of water are maintained at an elevated temperature of from about 60° C. to 130° C. The initial fractional equivalent of dicyclopentadiene containing 18 pbw of styrene polymerization products and 2 pbw or less styrene (prepared by free radical polymerization in situ of 20 pbw styrene in 80 pbw dicyclopentadiene) is added then allowed to react. A second fractional equivalent of water and of dicyclopentadiene containing styrene polymerization products is added and allowed to react. Additional fractional equivalents are added and each allowed to react before subsequent addition of the next increment until the desired amount of reactants have been added.

The polyol and polyamine, if used, are added to the hydrolysis reaction product and reacted as described in the aforementioned prehydrolysis method.

When a mixture containing a non-reactive hydrocarbon component such as, for example, a resin oil, is used, a substantial amount of the non-reactive hydrocarbon component is removed along with the water from the reaction. Lesser amounts of non-reactive hydrocarbon component can be left in the unsaturated polyester or polyesteramide to serve as a plasticizer which flexibilizes the unsaturated polyester or polyesteramide thus resulting in improved mechanical properties.

The products of the present invention are designated as polymer modified unsaturated polyesters and polyesteramides due to the presence of a dispersed polymer component derived from in situ polymerization of the ethylenically unsaturated aromatic hydrocarbon portion of the reactants used.

In other words, the result of the polymerization of the unsaturated aromatic hydrocarbons is a hydrocarbon polymer modified unsaturated polyester or polyesteramide resin.

As is common in the unsaturated polyester and polyesteramide art, the polymer modified unsaturated polyesters (polyesteramides) of this invention may be blended with a monomer that is compatible therewith. Typical of the vinyl monomers are the alkenyl aromatics, such as styrene, vinyltoluenes or chlorostyrenes. Acrylic monomers, although less preferred, may also be used separately or in conjunction with the vinyl aromatic monomer. Typical of the acrylic monomers is methylmethacrylate. Other useful vinyl monomers will be well known to the skilled artisian. The vinyl monomer, frequently called a reactive diluent, may be employed within a wide range of concentration of from about 20 to 80 percent of diluent to 80 to 20 percent of resin. The optimum amount will depend in large measure on the unsaturated polyester (polyesteramide), the diluent, and the properties desired in the cured and uncured states. Reactive diluents are employed principally to adjust the viscosity of a resin blend to permit its facile use in a given fabrication procedure.

Other additives that are conventional to the unsaturated polyester art may also be included in formulations based upon the resins of the present invention. Thus fillers, pigments and other colorants, reinforcing fibers, stabilizers, shrinkage control agents, other resins and polymers and other additives may be added to serve their intended function.

The polymer modified unsaturated polyesters (polyesteramides) have properties that make them well adapted for coating, casting, lamination, molding, filament winding, pultrusion and other known fabrication procedures. A preferred use is in castings, encapsulations and the like which benefit from the reduced shrinkage upon curing inherent to the resins of the present invention.

The polymer modified unsaturated polyesters (polyesteramides) are curable by known catalyst systems including the previously described free-radical forming catalysts. Peroxides, such as methylethylketone peroxide, can be used with or without known promoters, such as cobalt octoate or cobalt naphthenate, that function with such peroxides. Acyl peroxides, such as benzoyl peroxides, can be used with or without promoters, such as tertiary amines, typically including N,N-dimethyl aniline and N,N-dimethyl-p-toluidine. The concentrations of catalyst and promoter are adjusted within known limits of about 0.05 to 3.0 weight percent depending on the rate of cure desired, the magnitude of the generated exotherm and for other known purposes.

Known gelation retarding agents, such as p-benzoquinone, can be employed in the curing system.

The following examples are given to illustrate the invention and not to limit the scope of the invention. All parts and percentages are by weight unless otherwise specified.

EXAMPLE 1

Maleic anhydride (306.97 g was added to a reactor and heated to 135° C. with stirring under a nitrogen atmosphere. Water (62.04 g) was added and immediately induced a maximum exotherm of 143° C. with the 135° C. temperature being reestablished within 5 minutes. Five minutes after the initial water addition, a commercial grade resin oil designated as Resin Oil 80 (hereinafter RO-80) and produced by The Dow Chemical Company, (115.12 g) was added to the reactor, the steam condenser was started, and nitrogen sparging was increased. A maximum exotherm of 142° C. occurred 1 minute after the initial RO-80 addition. Additional RO-80 (115.12 g) was added 15 minutes after the initial RO-80 addition, and 19 ml of water collected in the Dean Stark trap was removed and recycled to the reactor. A final portion of RO-80 (115.12 g was added 15 minutes later. The yellow-colored slurry was held for 30 minutes at 135° C., after which time the temperature controller was set at 160° C. Thirteen minutes later, 155° C. was reached and a propylene glycol/dipropylene glycol mixture (118.72 g/209.32 g) was added to the reactor. The 160° C. temperature was achieved 12 minutes later. After 2 hours at 160° C., the temperature controller was set at 205° C., and this temperature was achieved 32 minutes later. After 2.5 hours, a total of 91.5 ml of water layer and 100.5 ml of organic material were collected in the Dean Stark trap. The reactor was cooled to 168° C. and 100 ppm of hydroquinone were added. The modified unsaturated polyester was recovered as a transparent, light yellow-colored, tacky solid with a final acid number of 27.0.

A formulation containing 57.0 percent polyester and 43.0 percent syyrene was prepared and the physical and mechanical properties were determined. The heat distortion bars were cured at a room temperature of 25° C. (77° F.) using 0.1 percent cobalt naphthenate (6 percent), 1 percent methyl ethyl ketone peroxide, and 0.02 percent dimethylaniline. The room temperature cured bars were post-cured for 2.0 hours at 93° C. (200° F.). Clear, unfilled castings for use in tensile and flexural strength evaluations were made using a cure system of 1.0 percent benzoyl peroxide and 0.01 percent dimethylaniline at room temperature, followed by post-curing for 2.0 hours at 93° C. (200° F.). Heat distortion temperatures (HDT) were determined using an Aminco Plastic Deflection Tester with standard methods (ASTM D-648). Mechanical properties of tensile (8) and flexural (6) test pieces were determined using an Instron machine with standard methods (ASTM D-638 and D-790). Brookfield viscosity was measured at 25° C. All Barcol hardness values (average of ten) were on the 934-1 scale. The results are summarized in Table I.

TABLE I

| | |
|---|---|
| Brookfield Viscosity (Pa.s) | .035 |
| SPI Gel Time (min) | 5.6 |
| Cure Time (min) | 10.5 |
| Max. Exotherm (°C.) | 147 |
| Heat Distortion Temperature | |
| (°F.) | 137 |
| (°C.) | 58.3 |

TABLE I-continued

| | |
|---|---|
| Average Barcol Hardness | 34 |
| Tensile Strength × 10³ (psi) | 7.632 |
| [kPa × 10³] | [52.62] |
| Elongation (%) | 2.75 |
| Flexural Strength × 10⁴ (psi) | 1.2320 |
| [kPa × 10⁴] | [8.495] |

Capillary gas chromatographic-mass spectroscopic analysis of the RO-80 used in Example 1 provided the following results:

| | Weight Percent |
|---|---|
| toluene | 0.11 |
| p-xylene | 0.15 |
| m-xylene | 0.26 |
| o-xylene | 0.73 |
| styrene | 2.03 (2) |
| 1-methyl-4-ethylbenzene | 0.64 |
| 1-methyl-3-ethylbenzene | 4.89 |
| allylbenzene | 0.87 (2) |
| 1,3,5-trimethylbenzene | 1.54 |
| 1-methyl-2-ethylbenzene | 1.31 |
| 1,2,4-trimethylbenzene | 4.24 |
| α-methylstyrene | 2.29 (2) |
| dicyclopentadiene | 30.19 (1) |
| vinyl toluene | 18.61 (2) |
| indene | 12.85 (1) |
| methyl indenes | 1.25 (1) |
| naphthalene | 1.25 |
| 2-methyl naphthalene | 0.02 |
| others | 16.77 |

Based on this analysis, the esterified hydrocarbon reactives component (1) comprises 44.29 percent by weight, the ethylenically unsaturated aromatic hydrocarbon reactives component (2) comprises 23.80 percent by weight and the nonreactive hydrocarbons component comprises the balance by difference.

EXAMPLE 2

Maleic anhydride (3.13 moles, 306.97 g) was added to a reactor and heated to 135° C. under a nitrogen atmosphere with stirring. Water (3.443 moles, 62.04 g) was added and immediately induced a maximum exotherm of 143° C. with the 135° C. temperature being reestablished 2 minutes later. Five minutes after the initial water addition, partially polymerized RO-80 (115.12 g) was added to the reactor. A maximum exotherm of 141° C. occurred 1 minute later. Air cooling of the reactor exterior reduced the reactor temperature to 135° C. A second portion of partially polymerized RO-80 (115.12 g) was added 15 minutes after the initial RO-80 addition. A final portion of partially polymerized RO-80 (115.12 g) was added 15 minutes later and the 135° C. reaction temperature was reachieved 2 minutes later. After 30 minutes, a propylene glycol/dipropylene glycol mixture (1.56 moles, 118.72 g/1.56 moles, 209.32 g) was added to the reactor and the steam condenser was started. Nitrogen sparging was increased to 0.5 liter per minute, and the temperature controller was set at 160° C. The 160° C. temperature was reached 19 minutes later. After 2 hours at 160° C., the temperature controller was set at 205° C. and this temperature was achieved 25 minutes later. After 14.0 hours, a total of 103.5 ml of water layer and 82 ml of organic material were collected in the Dean Stark trap. The reactor was cooled to 165° C. and 100 ppm of hydroquinone were added. The modified unsaturated polyester was recovered as a transparent light yellow-colored solid with a final acid number of 11.5.

The partially polymerized RO-80 used in this example was obtained by treating the RO-80 of Example 1 to 0.23 percent by weight of azobisisobutyronitrile and reacting the mixture for 2 hours at 70° C. a nitrogen atmosphere. The reaction product was then treated with 0.12 percent by weight of benzoyl peroxide and the mixture was reacted for one hour at 100° C. in a nitrogen atmosphere.

The recovered RO-80 product containing polymerized ethylenically unsaturated aromatic hydrocarbon reactives possessed a Brookfield viscosity (25° C.) of 130 cp (versus less than 5 cp for the non-polymerized RO-80) and was a transparent, homogenous solution.

A portion of the modified, unsaturated polyester (199.5 g) and styrene (150.5 g) were formulated to provide a 57.0, 43.0 percent solution, respectively. The physical and mechanical properties were determined using the method of Example 1. The results are summarized in Table II.

TABLE II

| Brookfield Viscosity (Pa.s) | .560 |
|---|---|
| SPI Gel | |
| Gel Time (min) | 3.5 |
| Cure Time (min) | 6.1 |
| Max. Exotherm (°C.) | 201 |
| Heat Distortion Temperature | |
| (°F.) | 209 |
| [°C.] | [98.3] |
| Average Barcol Hardness | 43 |
| Tensile Strength × $10^3$ (psi) | 8.3 |
| [kPa × $10^3$] | [57.23] |
| Elongation (%) | 2.1 |
| Flexural Strength × $10^3$ (psi) | 14.3 |
| [kPa × $10^3$] | [98.6] |
| Flexural Modulus × $10^4$ (psi) | 59.0 |
| [kPa × $10^4$] | [406.8] |

EXAMPLE 3

Maleic anhydride (5.00 moles, 490.3 g) was added to a reactor and heated to 100° C. under a nitrogen atmosphere with stirring. Water (5.50 moles, 99.11 g) was added and induced a maximum exotherm of 139° C. two minutes later. Cooling reduced the reactor temperature to 130° C. after an additional 5 minutes. Fifteen minutes after the initial water addition, a commercial grade of resin oil designated as Resin Oil 60 (hereinafter RO-60) and produced by The Dow Chemical Company (288.1 g) was added to the reactor. A maximum exotherm of 143° C. occurred 2 minutes later. Cooling reduced the reactor temperature to 130° C. A second portion of Resin Oil 60 (288.1 g) was added 15 minutes after the initial RO-60 addition. A final portion of RO-60 (288.1 g) was added 15 minutes later, and the 130° C. reaction temperature was reachieved 3 minutes later. Thirty minutes after the addition of the final portion of RO-60, propylene glycol (3.00 moles, 228.3 g) as added to the reactor, the steam condenser was started, nitrogen sparging was increased to 0.75 liter per minute and the temperature controller was set at 160° C. The 160° C. temperature was achieved 26 minutes later. After 2 hours at 160° C., the temperature controller was set at 205° C. and this temperature was achieved 14 minutes later. After 10 hours, a total of 115 ml of water layer and 174 ml of organic material were collected into the Dean Stark trap. The reactor was cooled to 165° C. and 100 ppm of hydroquinone were added. The modified unsaturated polyester was recovered as a transparent, light yellow-colored solid with a final acid number of 30.1. Mass balance calculations verified that essentially all of the esterifiable hydrocarbon reactives and ethylenically unsaturated aromatic hydrocarbons were incorporated into the polyester while in excess of 95 percent of the nonreactive hydrocarbons were recovered into the Dean Stark trap.

Capillary gas chromatographic-mass spectroscopic analysis of the RO-60 demonstrated the following composition: 64.36 weight percent esterifiable hydrocarbon reactives composed of cyclopentadiene (2.95 percent), butadiene/cyclopentadiene codimers (3.96 percent), dicyclopentadiene (45.81 percent), indene (4.37 percent), isoprene/cyclopentadiene codimer (1.49 percent) amd methylcyclopentadiene/cyclopentadiene codimer (5.78 percent); 16.14 weight percent ethylenically unsaturated aromatic hydrocarbon reactives composed primarily of styrene and less than 1 percent vinyl toluene; and 19.50 weight percent nonreactive hydrocarbons composed of toluene (0.12 percent), naphthalene (0.30 percent), xylenes, ethylbenzenes, trimethylbenzenes, methylethylbenzenes, and the like.

A portion of the modified unsaturated polyester (199.5 g) and styrene (150.5 g) were formulated to provide a 57.0, 43.0 percent solution, respectively. The physical and mechanical properties were determined using the method of Example 1. Unnotched Izod impact was determined using ten 2.5×0.5×0.125 inch test pieces prepared from the clear, unfilled casting. The unnotched Izod impact was evaluated for the series of test pieces using a TMI Impact Tester No. 43-1 with standard methods (ASTM D-256). The results are reported in Table III.

TABLE III

| Brookfield Viscosity (Pa.s) | .251 |
|---|---|
| SPI Gel | |
| Gel Time (min.) | 3.2 |
| Cure Time (min.) | 7.7 |
| Max. Exotherm (°C.) | 166 |
| Average Barcol Hardness | 42 |
| Heat Distortion Temp. | |
| (°F.) | 182 |
| [°C.] | [83.3] |
| Tensile Strength × $10^3$ (psi) | 7.402 |
| [kPa × $10^3$] | [51.037] |
| Elongation (%) | 1.50 |
| Flexural Strength × $10^3$ (psi) | 12.139 |
| [kPa × $10^3$] | [83.698] |
| Flexural Modulus × $10^4$ (psi) | 65.3 |
| [kPa × $10^4$] | [450.244] |
| Izod Impact, unnotched (ft. lbs/in.) | 1.9 |
| [Joules/m] | [101.47] |

EXAMPLE 4

Maleic anhydride (5.00 moles, 490.3 g) was added to a reactor and heated to 100° C. under a nitrogen atmosphere with stirring. Water (5.50 moles, 99.11 g) was added and induced a maximum exotherm of 138° C. one minute later. Cooling reduced the reactor temperature to 130° C. after an additional 3 minutes. Fifteen minutes after the initial water addition, a commercial grade of resin oil designated as RO-60 (288.1 g) was added to the reactor. The composition of the RO-60 was identical to that delineated in Example 3. A maximum exotherm of 143° C. occurred 2 minutes later. Cooling reduced the reactor temperature to 130° C. A second portion of RO-60 (288.1 g) was added 15 minutes after the initial RO-60 addition. A final portion of RO-60 (288.1 g) was added 15 minutes later and the 130° C. reaction temperature was reachieved 3 minutes later. Thirty minutes after the addition of the final portion of RO-60, ethylene glycol (3.00 moles, 186.18 g) was added to the reactor, the steam condenser was started, nitrogen sparging was increased to 0.75 liter per minute, and the temperature controller was set at 160° C. The 160° C. temperature was achieved 28 minutes later. After 2 hours at 160° C., the temperature controller was set at 205° C. and this temperature was achieved 26 minutes later. After 8 hours, a total of 100 ml of water layer and 127 ml of organic material were collected in the Dean Stark trap. The reactor was cooled to 165° C. and 100 ppm of hydroquinone were added. The modified unsaturated polyester was recovered as a transparent, light yellow-colored solid with a final acid number of 31.7. Essentially all of the esterifiable hydrocarbon reactives and ethylenically unsaturated aromatic hydrocarbons were incorporated into the polyester while the bulk of the nonreactive hydrocarbons were recovered in the Dean Stark trap as determined by mass balance calculations.

A portion of the modified unsaturated polyester (199.5 g) and styrene (150.5 g) were formulated to provide a 57.0, 43.0 percent solution, respectively. The physical and mechanical properties were determined using the method of Example 1. The unnotched Izod impact was determined using the method of Example 3. The results are reported in Table IV.

TABLE IV

| | |
|---|---|
| Brookfield Viscosity (Pa.s) | .260 |
| SPI Gel | |
| Gel Time (min.) | 3.6 |
| Cure Time (min.) | 7.7 |
| Max. Exotherm (°C.) | 166 |
| Average Barcol Hardness | 42 |
| Heat Distortion Temp. | |
| (°F.) | 173 |
| [°C.] | [78.3] |
| Tensile Strength $\times 10^3$ (psi) | 8.870 |
| [kPa $\times 10^3$] | [61.159] |
| Elongation (%) | 1.75 |
| Flexural Strength $\times 10^3$ (psi) | 14.075 |
| [kPa $\times 10^3$] | [97.047] |
| Flexural Modulus $\times 10^4$ (psi) | 64.6 |
| [kPa $\times 10^4$] | [445.42] |
| Izod Impact, unnotched (ft. lbs/in.) | 2.0 |
| [Joules/m] | [106.756] |

EXAMPLE 5

Maleic anhydride (2.22 moles, 217.91 g) was added to a reactor and heated to 100° C. under a nitrogen atmosphere with stirring. Water (2.44 moles, 44.05 g) was added and induced a maximum exotherm of 136° C. two minutes later. Cooling reduced the reactor temperature to 130° C. after an additional 3 minutes. Fifteen minutes after the initial water addition, partially polymerized RO-60 (128.03 g) was added to the reactor. A maximum exotherm of 144° C. occurred 2 minutes later. Cooling reduced the reactor temperature to 130° C. A second portion of RO-60 (128.03 g) was added 15 minutes after the initial RO-60 addition. A final portion of the same RO-60 (128.03 g) was added 15 minutes later and the 130° C. reaction temperature was reachieved 2 minutes later. Thirty minutes after the addition of the final portion of RO-60, propylene glycol (1.33 moles, 101.47 g) was added to the reactor, the steam condenser was started, nitrogen sparging was increased to 0.5 liter per minute, and the temperature controller was set at 160° C. The 160° C. temperature was achieved 17 minutes later. After 2 hours at 160° C., the temperature controller was set at 205° C. and this temperature was achieved 15 minutes later. After 5 hours at the 205° C. reaction temperature, the reactor was cooled to 165° C. and 100 ppm of hydroquinone were added. The modified unsaturated polyester was recovered as a transparent, light yellow-colored solid with a final acid number of 38.9. Mass balance calculations verified that essentially all of the esterifiable hydrocarbon reactives and ethylenically unsaturated aromatic hydrocarbons were incorporated into the polyester while the bulk of the nonreactive hydrocarbons were recovered in the Dean Stark trap.

The partially polymerized RO-60 used in this example was obtained by treating the RO-60 of Example 3 to 0.1 percent by weight of azobisisobutyronitrile and reacting the mixture for 19.5 hours at 60° C. under a nitrogen blanket.

A portion of the modified unsaturated polyester (199.5 g) and styrene (150.5 g) were formulated to provide a 57.0, 43.0 percent solution, respectively. The physical and mechanical properties were determined using the method of Example 1. The unnotched Izod impact was determined using the method of Example 3. The results are reported in Table V.

TABLE V

| | |
|---|---|
| Brookfield Viscosity (Pa.s) | .294 |
| SPI Gel | |
| Gel Time (min.) | 4.0 |
| Cure Time (min.) | 8.6 |
| Max. Exotherm (°C.) | 164 |
| Average Barcol Hardness | 42 |
| Heat Distortion Temp. | |
| (°F.) | 184 |
| [°C.] | [84] |
| Tensile Strength $\times 10^3$ (psi) | 7.865 |
| [kPa $\times 10^3$] | [54.229] |
| Elongation (%) | 1.65 |
| Flexural Strength $\times 10^3$ (psi) | 14.521 |
| [kPa $\times 10^3$] | [100.122] |
| Flexural Modulus $\times 10^4$ (psi) | 60.70 |
| [kPa $\times 10^4$] | [418.526] |
| Izod Impact, unnotched (ft. lbs/in.) | 1.9 |
| [Joules/m] | [101.47] |

COMPARATIVE EXAMPLE 1

Dicyclopentadiene Modified Unsaturated Polyester

Maleic anhydride (7.0 moles, 686.42 g) was added to a reactor and heated to a clear, stirred solution maintained at 100° C. under a nitrogen atmosphere. Water (7.1 moles, 127.94 g) was added to the reactor. A maximum exotherm of 134° C. resulted 2 minutes later, followed by a decrease in the reaction temperature to 121° C. fifteen minutes after the initial water addition. At this time, dicyclopentadiene (2.10 moles, 277.64 g) of 97 percent purity was added. A maximum exotherm of 125° C. resulted 2 minutes later with a 120° C. temperature being reestablished 4 minutes after the initial dicyclopentadiene addition. Fifteen minutes after the initial addition of dicyclopentadiene, a second portion of dicyclopentadiene (2.10 moles, 277.64 g) was added. Fifteen minutes later, a final portion of dicyclopentadiene (2.10 moles, 277.64 g) was added and the temperature controller was maintained at 120° C. This temperature was reestablished 3 minutes later. After 30 minutes, propylene glycol (4.20 moles, 319.62 g) was added to the reactor and the steam condenser was started, nitrogen sparging was increased to 0.5 liter per minute, and the temperature controller was set at 160° C. The 160°

C. temperature was reached 31 minutes (1860 s) later. After 2 hours at 160° C., the temperature controller was set at 205° C., and this temperature was achieved 32 minutes later. After 6.1 hours, a total of 141.5 ml of water layer and 14 ml of organic material were collected in the Dean Stark trap. The reactor was cooled to 165° C. and 100 ppm of hydroquinone were added. The dicyclopentadiene modified unsaturated polyester was recovered as a transparent, light yellow-colored solid with a final acid number of 26.8.

A portion of the dicyclopentadiene modified unsaturated polyester (199.5 g) and styrene (150.5 g) were formulated to provide a 57.0, 43.0 percent solution, respectively. The physical and mechanical properties were determined using the method of Example 1. The unnotched Izod impact was determined using the method of Example 3. The results are reported in Table VI.

TABLE VI

| | |
|---|---|
| Brookfield Viscosity (Pa.s) | 0.055 |
| SPI Gel | |
| Gel Time (min.) | 3.0 |
| Cure Time (min.) | 5.5 |
| Max. Exotherm (°C.) | 226 |
| Average Barcol Hardness | 35 |
| Heat Distortion Temp. | |
| (°F.) | 238 |
| [°C.] | [114.5] |
| Tensile Strength $\times 10^3$ (psi) | 4.568 |
| [kPa $\times 10^3$] | [31.496] |
| Elongation (%) | 0.94 |
| Flexural Strength $\times 10^3$ (psi) | 9.672 |
| [kPa $\times 10^3$] | [66.688] |
| Flexural Modulus $\times 10^4$ (psi) | 61.00 |
| [kPa $\times 10^4$] | [420.595] |
| Izod Impact, unnotched (ft. lbs/in.) | 1.0 |
| [Joules/m] | [39.37] |

EXAMPLE 6

The percent volume shrinkage was determined from the densities of the cured resin and the liquid resin of Examples 4 and 5 and Comparative Example 1. For additional comparison, the volume shrinkage was also determined for a styrenated (43 percent) tetrahydrophthalate unsaturated polyester prepared from maleic anhydride (1.8 moles, 182.58 g) and propylene glycol (2.20 moles, 167.42 g) (acid number 24.5). The results are reported in Table VII.

TABLE VII

| | Volume Shrinkage (percent) |
|---|---|
| Example 4 | 7.60 |
| Example 5 | 7.86 |
| Comparative Example 1 (1) | 8.20 |
| Tetrahydrophthalate Unsaturated Polyester Resin (1) | 9.92 |

(1) Not an embodiment of the invention.

EXAMPLE 7

A polymer modified unsaturated polyesteramide resin was prepared in a 100 gallon, 316 stainless steel reactor. The reactor was equipped with mechanical stirring, flow meter controlled inlet lines and associated valving for nitrogen, water, RO-60, propylene glycol-piperazine solution and styrene. The respective liquid reactants were metered into the reactor from individual drums using calibrated drum pumps. A scale was used to monitor the weight loss from each drum during pumping. Heating and cooling were provided to the reactor jacket via a recirculating pump for the heat transfer fluid. Heat was provided to the heat transfer fluid reservoir via a pair of thermostated in-line electric heaters. Finned cooling coils with a water curtain provided for rapid cooling when activated. The reactor overhead section was fitted with a manway for charging solid maleic anhydride briquettes or hydroquinone and a steam-jacketed condensor. A chilled, water condensor and knock-out pot fitted with a drain valve were used to recover condensate from the steam-jacketed condensor. Product was recovered from the reactor through a ram valve into a 10 micron filter assembly and to a valved drumming outlet.

The RO-60 used was analyzed by capillary gas chromatography and possessed the following composition:

| | Weight Percent |
|---|---|
| Esterifiable Hydrocarbon Reactives: | |
| Isoprene-cyclopentadiene codimer | 1.65 |
| Indene | 4.03 |
| Methylcyclopentadiene-cyclopentadiene codimer | 6.17 |
| Butadiene-cyclopentadiene codimer | 5.32 |
| Dicyclopentadiene | 45.89 |
| Cyclopentadiene | 1.56 |
| Sub total | 64.62 |
| Ethylenically Unsaturated Aromatic Hydrocarbons: | |
| Styrene and Vinyl Toluenes | 15.96 |
| Non-Reactive Hydrocarbons: | 19.42 |
| Total | 100.00 |

The following reaction sequence and stoichiometry was used:

| Reaction Step | Cumulative Reaction Time (hrs/min) |
|---|---|
| Water addition (62 lbs @ 1.9 gph)[1] started into 100° C. stirred solution of maleic anhydride (169 lbs) under 0.375 scfh nitrogen | 0 |
| First 31 lbs water in, start adding second 31 lbs water | 1/45 |
| All water added, reaction temperature between 90–110° C., start recycle of distilled hydrocarbons and water back into reactor | 1/50 |
| Resin Oil 60 addition (320.1 lbs @ 0.66 gpm) started | 2/0 |
| Resin Oil 60 addition completed, temperature controller set at 135° C. | 2/55 |
| Hydrolysis reaction completed, [acid number], recycle of distilled hydrocarbons and water stopped | 4/55 [218] |
| Piperazine-ethylene glycol solution (66.7 lbs)[2] added, temperature controller set at 160° C., nitrogen sparge set to 7.5 scfh, 2,5-di-tert-butyl hydroquinone (12.6 grams) added as process inhibitor | 5/50 |
| Reaction at 160° C. completed, temperature controller set at 205° C. [acid number] | 7/50 [120] |
| 205° C. reached | 10/0 |
| Nitrogen sparge set at 2.75 scfm | 11/40 |
| Reaction at 205° C. completed, cooling started, turn nitrogen sparge down to 0.375 scfh | 15/30 |
| Hydroquinone (58.9 grams) added at 150° C., [acid number] | 16/40 [27] |
| 2% O$_2$ in N$_2$ started at 125° C. | 17/15 |
| Styrene (372.4 lbs) added at 110° C. | 18/0 |
| Styrenated product drummed[3] | 19/30 |
| Volume water layer recovered = | 28,700 mls. |
| Volume hydrocarbon layer recovered = | 45,750 mls. |

-continued

| Reaction Step | Cumulative Reaction Time (hrs/min) |
|---|---|
| Total | 74,450 mls. |

NOTES:
[1]The second 31 lbs water was dumped in through the reactor sample valve (not added @ 1.9 gph).
[2]The solution contained 13.37 weight percent piperazine and 86.63 weight percent ethylene glycol.
[3]Contained 43 percent by weight styrene.

The physical and mechanical properties were determined using the method of Example 1. The results are reported in Table VIII.

TABLE VIII

| Brookfield Viscosity (Pa.s) | 0.053 |
|---|---|
| SPI Gel | |
| Gel Time (min) | 4.2 |
| Cure Time (min) | 7.9 |
| Max. Exotherm (°C.) | 190 |
| Average Barcol Hardness | 41 |
| Heat Distortion Temperature | |
| (°F.) | 199 |
| [°C.] | [92.8] |
| Tensile Strength × $10^3$ (psi) | 9.157 |
| [kPa × $10^3$] | [63.136] |
| Elongation (%) | 2.02 |
| Flexural Strength × $10^3$ (psi) | 13.638 |
| [kPa × $10^4$] | [99.031] |
| Flexural Modulus × $10^4$ (psi) | 59.80 |
| [kPa × $10^4$] | [412.309] |

EXAMPLE 8

A polymer modified unsaturated polyesteramide resin was prepared using the method of Example 7. The following reaction sequence and stoichiometry was used:

| Reaction Step | Cumulative Reaction Time (hrs/min) |
|---|---|
| Water addition (36.2 lbs @ 1.1 gph)[1] started into 100° C. stirred solution of maleic anhydride (95.8 lbs) under 0.375 scfh nitrogen | 0 |
| First 17.6 lbs water in, start adding second 18.6 lbs water | 2/5 |
| All water added, reaction temperature between 90–110° C., start recycle of distilled hydrocarbons and water back into reactor | 2/12 |
| Resin Oil 60 addition (181.4 lbs @ 0.37 gpm) started | 2/15 |
| Resin Oil 60 addition completed, temperature controller set at 135° C. | 3/0 |
| Hydrolysis reaction completed, reaction temperature = 120° C., [acid number], of distilled hydrocarbons and water stopped | 6/40 [224] |
| Piperazine-glycerine polypropoxylate-ethylene glycol solution (67.6 lbs)[1] added, temperature controller set at 160° C., nitrogen sparge set to 7.5 scfh, 2,5-di-tert-butyl hydroquinone (12.6 grams) added as process inhibitor | 6/45 |
| Reaction at 160° C. completed, temperature controller set at 205° C. [acid number] | 8/0 [131] |
| 205° C. reached | 10/0 |
| Nitrogen sparge set at 2.75 scfm | 11/35 |
| Reaction at 205° C. completed, cooling started, turn nitrogen sparge down to 0.375 scfh | 14/35 |
| Hydroquinone (58.9 grams) added at 150° C., [acid number] | 16/55 [23.8] |
| 2% $O_2$ in $N_2$ started at 125° C. | 17/40 |
| Styrene (233.3 lbs) added at 110° C. | 18/35 |
| Styrenated product drummed[2] | 20/25 |
| Volume water layer recovered = | 16,750 mls. |
| Volume hydrocarbon layer recovered = | 24,750 mls. |
| Total | 41,500 mls. |

NOTES:
[1]The glycerine polypropoxylate used was a reaction product of glycerine and propylene oxide in a 1 to 9 mole ratio (available from The Dow Chemical Company as Voranol* 2070). The hydroxyl equivalent weight was 689.75. The solution contained 7.48 weight percent piperazine, 41.62 weight percent ethylene glycol and 50.90 weight percent glycerine polypropoxylate.
[2]Contained 43 percent by weight styrene.
*Trademark of The Dow Chemical Co.

The physical and mechanical properties were determined using the method of Example 1. The results are reported in Table IX.

TABLE IX

| Brookfield Viscosity (Pa.s) | 0.147 |
|---|---|
| SPI Gel | |
| Gel Time (min) | 3.6 |
| Cure Time (min) | 7.0 |
| Max. Exotherm (°C.) | 189 |
| Average Barcol Hardness | 36 |
| Heat Distortion Temperature | |
| (°F.) | 176 |
| [°C.] | [80] |
| Tensile Strength × $10^3$ (psi) | 9.436 |
| [kPa × $10^3$] | [65.059] |
| Elongation (%) | 2.41 |
| Flexural Strength × $10^3$ (psi) | 15.244 |
| [kPa × $10^3$] | [105.104] |
| Flexural Modulus × $10^4$ (psi) | 56.30 |
| [kPa × $10^3$] | [388.177] |

I claim:

1. A polymer modified unsaturated polyester(amide) produced by reacting the following reactants under resin forming conditions
    (A) one of more alpha, beta ethylenically unsaturated polycarboxylic acids, anhydrides, or mixtures thereof with or without one or more saturated or aromatic polycarboxylic acids or anhydrides thereof
    (B) about 1.1 to about 2.0 moles of water per mole of said unsaturated acids or anhydrides,
    (C) one or more polyols or a mixture of polyols and polyamines and
    (D) a hydrocarbon mixture comprising
        (1) esterifiable hydrocarbons,
        (2) 5 to 50 percent by weight of ehtylenically unsaturated aromatic hydrocarbons with or without polymerized derivatives thereof and
        (3) non-reactive hydrocarbons.

2. The polyester(amide) of claim 1 wherein said water is used in an amount from 1.5 to about 2.0 moles per mole of unsaturated polycarboxylic acid or anhydride.

3. The polyester(amide) of claim 1 wherein said hydrocarbon mixture comprises 25 to 95 percent by weight of esterifiable hydrocarbons, 5 to 50 percent by weight of ethylenically unsaturated aromatic hydrocarbons with or without polymerized derivatives thereof, and the remainder non-reactive hydrocarbons.

4. The polyester(amide) of claim 3 wherein said hydrocarbon mixture is used in an amount to provide from 0.25 to about 1.0 moles of esterifiable hydrocarbons per mole of unsaturated polycarboxylic acid or anhydride.

5. The polyester(amide) of claim 3 wherein said ethylenically unsaturated aromatic hydrocarbons have been polymerized to provide 5 to 100 percent by weight of oligomers and/or polymers.

6. The polyester(amide) of claim 3 wherein said ethylenically unsaturated aromatic hydrocarbons have been polymerized to provide 10 to 50 percent by weight of oligomers and/or polymers.

7. A curable resinous composition comprising the polymer modified unsaturated polyester(amide) resin of claims 1, 2, 3, 4, 5 or 6 and one or more ethylenically unsaturated monomers.

8. The curable resinous composition as set forth in claim 7 wherein the ethylenically unsaturated monomer is styrene.

9. The cured composition of claim 7.

10. The cured composition of claim 8.

* * * * *